No. 854,118. PATENTED MAY 21, 1907.
V. STAVENIK & J. MAUTZ.
TUBE EXPANDER.
APPLICATION FILED SEPT. 6, 1906.

Witnesses:
Pearl Ackerman
David J. Davies

Inventors:
Victor Stavenik and
John Mautz
By John H. Cross
their attorney

UNITED STATES PATENT OFFICE.

VICTOR STAVENIK AND JOHN MAUTZ, OF MANSFIELD, OHIO.

TUBE-EXPANDER.

No. 854,118.　　　Specification of Letters Patent.　　　Patented May 21, 1907.

Application filed September 6, 1906. Serial No. 333,406.

*To all whom it may concern:*

Be it known that we, VICTOR STAVENIK and JOHN MAUTZ, citizens of the United States, residing at Mansfield, in the county of Richland and State of Ohio, have invented certain new and useful Improvements in Tube-Expanders, of which the following is a specification.

Our invention relates to tube expanders of the roller type and consists in the application of a tapering mandrel to a series of rollers journaled in suitable pocket bearings formed within a cylindrical head and open at the periphery or surface of the head permitting the rollers to extend above the surface.

The object of our improvement is to provide a means of rotatably mounting a series of cylindrical rollers in a head constructed in such a manner as to be radially expanded by a tapered mandrel through the medium of a screw feed which is adapted to increase or decrease the radial expansion of the rollers.

A further object of our invention is the construction of a simple roller carrying head having an unobstructed outer periphery and whereby the rollers can be inserted in or withdrawn from the tube for the purpose of expansion any required depth and adjustably retained at any point desired.

We attain these and other objects by the mechanism illustrated in the accompanying drawings in which—

Figure 1:
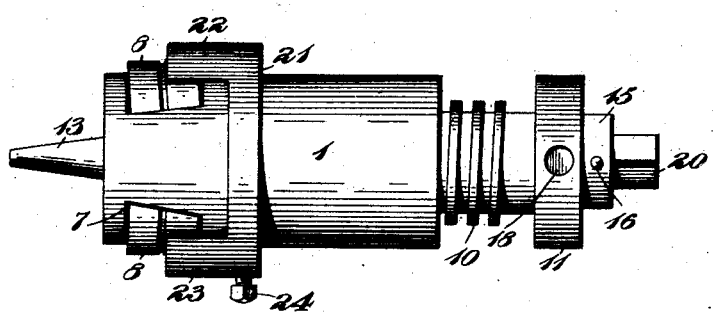
Figure 2:
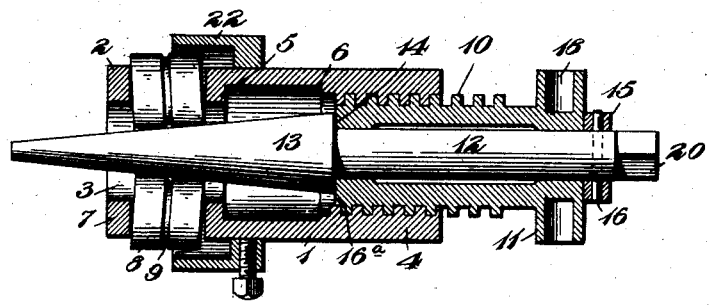
Figure 3:
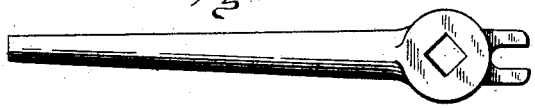

Figure 1 is a side view of a tube expander embodying our invention. Fig. 2 is a longitudinal sectional side view of the Fig. 1. Fig. 3 is a vertical longitudinal view of a wrench adapted to rotate the tapered mandrel and feed screw.

Similar reference characters refer to similar parts throughout the several views.

In the drawings (1) represents the roller carrying head comprising a cylindrical sleeve with its inner periphery provided with a bore of different diameters. The forward end (2) of the inner periphery of the head is bored smooth leaving an aperture (3) of suitable diameter. The rear end (4) of the inner periphery of the head is screw-threaded. Intermediate of the ends (2) and (4) the head is bored larger in diameter than the ends (2) and (4) forming the shoulders (5) and (6). Adjacent to the end (2) of the head a series of tapered pocket bearings (7) are provided and disposed longitudinally therewith. These pocket bearings are substantially cylindrical in shape and are formed within the head arranged in cylindrical outline and open at the outer periphery of the head.

Hardened steel rollers (8) are journaled in the pocket bearings with the periphery thereof extending above the outer periphery of the head. These rollers have an annular groove (9) in the center to permit the surplus stock of the tube to form a ridge to indicate to the operator of the expander the extent of the expansion of the tube. A feed screw (10) having a collar (11) formed on one end is adapted to engage with the screw threaded interior of the rear end (4) of the head.

The inner periphery of the feed screw (10) is bored smooth to receive and journal the stem (12) of a tapered mandrel (13). The stem (12) is turned smaller than the larger diameter of the mandrel forming a shoulder (14). The stem (12) projects beyond the outer face of the collar (11) of the feed screw and upon the projecting end adjacent to its face a collar (15) is fitted and rigidly secured to the stem of the mandrel by the pin (16) which passes through the collar and projecting end of the stem.

It will be noted that the shoulder (14) of the mandrel abuts against the end (16$^a$) of the feed screw when it is inserted in the aperture of the feed screw and the face of the collar (11) contacts with the inner face of the collar (15) thereby leaving the feed screw rotatably interposed between the shoulder and the collar and connecting the screw feed and mandrel together. When the feed screw is brought in engagement with the threaded inner periphery of the head, the tapered end of the mandrel projects beyond the end (2) of the head through the aperture (3) of the head and adjustably supports the series of rollers which have tapered peripheries conforming with the tapered portion of the mandrel. When the feed screw (10) is turned to right or left, it forces the rollers more or less above the surface or outer periphery of the head bringing the rollers in contact with the inner periphery of the tube it is desired to expand or releasing the rollers at the will of the operator.

The feed screw is operated by inserting the end (17) of the wrench into the apertures (18) formed in the collar (11) of the feed screw. When the rollers are forced in proper contact with the tube for expansion through the medium of the feed screw, the mandrel is turned or rotated by the wrench which has an aperture (19) provided in the end and adapted to fit the end (20) of the mandrel which conforms to the shape of aperture provided therein.

An annular ring (21) is adjustably mounted on the outer periphery of the head having outwardly projecting segments (22) and (23) extending therefrom and adapted to contact with a front sheet of a boiler when a boiler tube is rolled or expanded. The operation of the expander is as follows. The end of the roller carrying head is inserted in the end of the tube and the annular ring adjusted to permit the insertion into the tube the required depth. The feed screw is then turned to the right forcing the tapered end of the mandrel forward and imparting an outward movement to the rollers to bring them in proper contact with the inner periphery of the tube it is desired to roll or expand. When the rollers are properly adjusted the wrench is placed on the end (20) of the stem of the mandrel and the mandrel rotated or turned for the purpose described.

It will be observed that there is no obstruction on the outer surface of the head except the annular guide ring which can be removed if necessary.

Reference character (24) designates a set screw used to retain the annular ring after adjustment.

Having fully described our invention what we claim and desire to secure by Letters Patent is—

1. In a tube expander, comprising a cylindrical head with a plane and unobstructed outer periphery and an inner periphery screw-threaded in one end with an annular recess formed therein to leave a contracted orifice in the opposite end, pocket bearings formed in one end of said head, rollers seated therein, a feed screw having its outer periphery screw-threaded to engage with said cylindrical head, a tapered mandrel journaled to said feed screw having a straight portion, a collar fitted to the straight portion of said mandrel and adapted to contact with one end of the feed screw whereby the feed screw is interposed between said collar and the shoulder formed on said mandrel, means to impart movement to said feed screw whereby the tapered portion of the mandrel is made to contact or expand the cylindrical outline formed by the rollers journaled in the pocket bearings.

2. In a tube expander, comprising a cylindrical head with a plane and an unobstructed outer periphery and an inner periphery screw-threaded in one end with an annular recess formed substantially in the central portion of the inner periphery leaving a contracted orifice in the opposite end, pocket bearings formed in one end of said head, rollers seated therein and adapted to extend above the outer periphery of the cylindrical head, a feed screw having a ring made integral therewith with apertures formed in the outer periphery, a tapered mandrel provided with a straight shank forming a shoulder and journaled in the inner periphery of the feed screw, a collar securely attached to the projecting end of the mandrel and adapted to contact with the face of the annular ring formed on the feed screw whereby the feed screw is interposed between said shoulder and collar, means to rotate said feed screw and mandrel independent of each other.

3. In a tube expander, comprising a cylindrical head with a plane and unobstructed outer periphery said head having an inner periphery screw threaded in one end and an annular recess formed therein leaving a contracted orifice in the opposite ends, pocket bearings formed in said cylindrical head, rollers seated in said pocket bearings and adapted to extend over the outer periphery of the cylindrical head, an annular ring having outwardly projecting segments extending therefrom fitted to the periphery of the cylindrical head and adapted to be adjusted thereupon, a feed screw fitted to the screw-threaded periphery of the cylindrical head, a tapered mandrel journaled in the inner periphery of said feed screw, a collar fitted to one end of the mandrel and adapted to contact with one end of the feed screw, means to rotate the mandrel, means to impart movement to the feed screw to expand or contract the rollers.

In testimony whereof we affix our signatures in presence of two witnesses.

VICTOR STAVENIK.
JOHN MAUTZ.

Witnesses:
PEARL ACKERMAN,
JOHN H. COSS.